United States Patent [19]
Anderson

[11] Patent Number: 5,385,464
[45] Date of Patent: Jan. 31, 1995

[54] APPARATUS FOR AUTOMATICALLY DISPENSING FOOD PRODUCT SUCH AS HARD ICE CREAM

[76] Inventor: David B. Anderson, 410 East St. George Blvd., St. George, Utah 84770

[21] Appl. No.: 68,134

[22] Filed: May 26, 1993

[51] Int. Cl.[6] .............................................. B29C 47/92
[52] U.S. Cl. .................... 425/145; 425/118; 425/276; 425/202; 62/342
[58] Field of Search ................. 62/340-342; 425/145, 150, 118, 202, 276; 222/52, 63, 80; 426/389, 512, 518, 524, 516, 231, 393, 418; 264/40.1, 40.5, 40.7, 28

[56] References Cited

U.S. PATENT DOCUMENTS

| | | | |
|---|---|---|---|
| 1,640,126 | 8/1927 | Knox et al. | 425/308 |
| 2,032,961 | 3/1936 | Vogt | 425/204 |
| 2,109,598 | 3/1938 | Stasinski et al. | 425/278 |
| 2,558,887 | 7/1951 | Tesiero | 425/143 |
| 2,579,096 | 12/1951 | Schulz | 425/376.1 |
| 2,651,186 | 9/1953 | Murphy | 62/342 |
| 2,719,494 | 10/1955 | Spiess, Jr. et al. | 425/145 |
| 2,728,306 | 12/1955 | Tarr | 426/516 |
| 4,420,948 | 12/1983 | Savage | 425/276 |
| 4,707,997 | 11/1987 | Bigler et al. | 264/28 |
| 4,796,784 | 1/1989 | Spirk et al. | 222/80 |
| 5,057,255 | 10/1991 | Sato et al. | 425/145 X |
| 5,059,364 | 10/1991 | Okubo et al. | 425/145 X |
| 5,149,551 | 9/1992 | Anderson | 426/231 |

FOREIGN PATENT DOCUMENTS

| | | | |
|---|---|---|---|
| 2813349 | 10/1978 | Germany | 62/340 |
| 63-263051 | 10/1988 | Japan | 62/340 |

*Primary Examiner*—Andres Kashnikow
*Assistant Examiner*—Kenneth DeRosa
*Attorney, Agent, or Firm*—Senniger, Powers, Leavitt & Roedel

[57] ABSTRACT

Apparatus for automatically dispensing food product, such as hard ice cream, comprising an insulated housing having a refrigerated chamber therein and a receptacle in the chamber for holding a supply of food product under refrigeration. The receptacle has an open upper end to permit loading of food product into the receptacle and a lower end. The apparatus further comprises a cutting apparatus adjacent the lower end of the receptacle for cutting food product from the supply, a conveyer mechanism in the chamber generally below the cutting apparatus for receiving food product cut from the supply and for conveying the food product from the chamber, a scoop member for receiving food product conveyed by the conveyer mechanism from the chamber and for dispensing a predetermined quantity of food product, and a sensing mechanism for sensing the extent to which food product becomes packed in the scoop member as it is conveyed to the scoop member and for effecting stoppage of the delivery of food product to the scoop member when the scoop member becomes packed to a predetermined extent.

20 Claims, 9 Drawing Sheets

APPARATUS FOR AUTOMATICALLY DISPENSING FOOD PRODUCT SUCH AS HARD ICE CREAM

BACKGROUND OF THE INVENTION

This invention relates generally to apparatus for dispensing ice cream and, more particularly, to an automated dispenser for dispensing hard ice cream (as opposed to soft ice cream) and other food products.

Automated ice cream dispensers typically found in convenience and fast food stores, for example, are adapted for dispensing soft ice cream only. These dispensers are expensive to fabricate, difficult to clean and, most significantly, are unable to dispense hard ice cream which represents over 90% of the ice cream market and is the most popular snack food. To dispense hard ice cream in commercial quantities, it has heretofore been necessary to hand scoop ice cream from relatively large tubs of ice cream. Not only is this manual process relatively slow, difficult and labor-intensive, it is also very unsanitary. Moreover, the quantity of ice cream scooped on each occasion varies considerably. Many of these same problems also arise in dispensing other food products such as potato salad, cole slaw and baked beans.

An apparatus for and method of dispensing food product, such as hard ice cream, is disclosed in U.S. Pat. No. 5,149,551, incorporated herein, of which the present subject matter is an improvement.

SUMMARY OF THE INVENTION

Among the several objects of this invention may be noted the provision of apparatus for automatically dispensing hard ice cream and other food products; the provision of such apparatus which consistently dispenses uniform portions of food product, such as ice cream, of the proper density; the provision of such apparatus which operates at a relatively high dispensing speed; the provision of such apparatus which is easy to load and operate by a single person; the provision of such apparatus which virtually eliminates any waste of product; the provision of such apparatus which is adapted for maintaining the freshness of the food product being dispensed; the provision of such apparatus which requires no handling of the food product after initial loading of the apparatus, thereby ensuring sanitary operation; the provision of such apparatus which is quick and easy to maintain; the provision of such apparatus which is economical to manufacture; and the provision of such apparatus which is attractive in appearance and durable in use.

Generally, apparatus of this invention for automatically dispensing food product, such as hard ice cream, comprises an insulated housing having a refrigerated chamber therein and a receptacle in the chamber for holding a supply of food product under refrigeration. The receptacle has an open upper end to permit loading of food product into the receptacle and a lower end. The apparatus further comprises cutting means adjacent the lower end of the receptacle for cutting food product from the supply, conveyer means in the chamber generally below the cutting means for receiving food product cut from the supply and for conveying the food product from the chamber, scoop means for receiving food product conveyed by the conveyer means from the chamber and for dispensing a predetermined quantity of food product, and means for sensing the extent to which food product becomes packed in the scoop means as it is conveyed to the scoop means and for effecting stoppage of the delivery of food product to the scoop means when the scoop means becomes packed to a predetermined extent.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Referring now to the drawings, and first more particularly to FIGS. 1–4, apparatus of the present invention for automatically dispensing food product, such as hard ice cream, is indicated in its entirety by the reference numeral 20. The apparatus comprises an insulated housing, generally designated 22, having a refrigerated container, generally designated 24, therein. Housing 22 is preferably made of stainless steel or other suitable material and has a front wall 26, a back wall 28, opposite side walls 30 and 32, and a top wall 34. Container 24, also preferably of stainless steel, is generally box-shaped and has a central vertical axis X and a generally planar bottom 36 (see FIG. 3). A tubular member 38 extends forward from the bottom 36 of container 24. Container 24 defines a refrigerated chamber 40 and tubular member 38 defines a receiving chamber 42. Receiving chamber 42 has an inlet 44 opening into a lower portion of the container 24 at a location immediately above the bottom 36 of the container 24 and an outlet 45 at the front of housing 22. Within container 24 is a receptacle 46 for holding a supply of food product such as "hard" ice cream (as opposed to "soft-serve" type ice cream). Preferably, receptacle 46 is cylindric in shape and is sized to receive a cylindric block of the food supply, such "hard" ice being commonly available in three-gallon cylindric blocks. Receptacle 46 has an open upper end 48 to permit loading of food product into receptacle 46 and an open lower end 50 to permit food product to be drawn from receptacle 46. The open upper end 48 is closed by an insulated lid 52 hinged to the top wall 34 of housing 22 so that the lid may be swung open to provide access to the interior of container 24. Receptacle 46 rests on a cutting assembly, generally designated 54, which is spaced from the bottom 36 of container 24 by a platform 56. First and second generally parallel screw conveyers 58 and 60, respectively, are positioned under cutting assembly 54 adjacent the bottom 36 of container 24 with first screw conveyer 58 extending from under cutting assembly 54, through the inlet 44 of receiving chamber 42, and substantially to outlet 45. A scoop mechanism, generally designated 62, is positioned forward of and adjacent outlet 45 of receiving chamber 42. As set forth in greater detail below, food product in receptacle 46 is cut by cutting assembly 54, falls into screw conveyors 58 and 60, and is conveyed (from left to right as viewed in FIGS. 3 and 4) through receiving chamber 42 to scoop mechanism 62.

Figure 3:
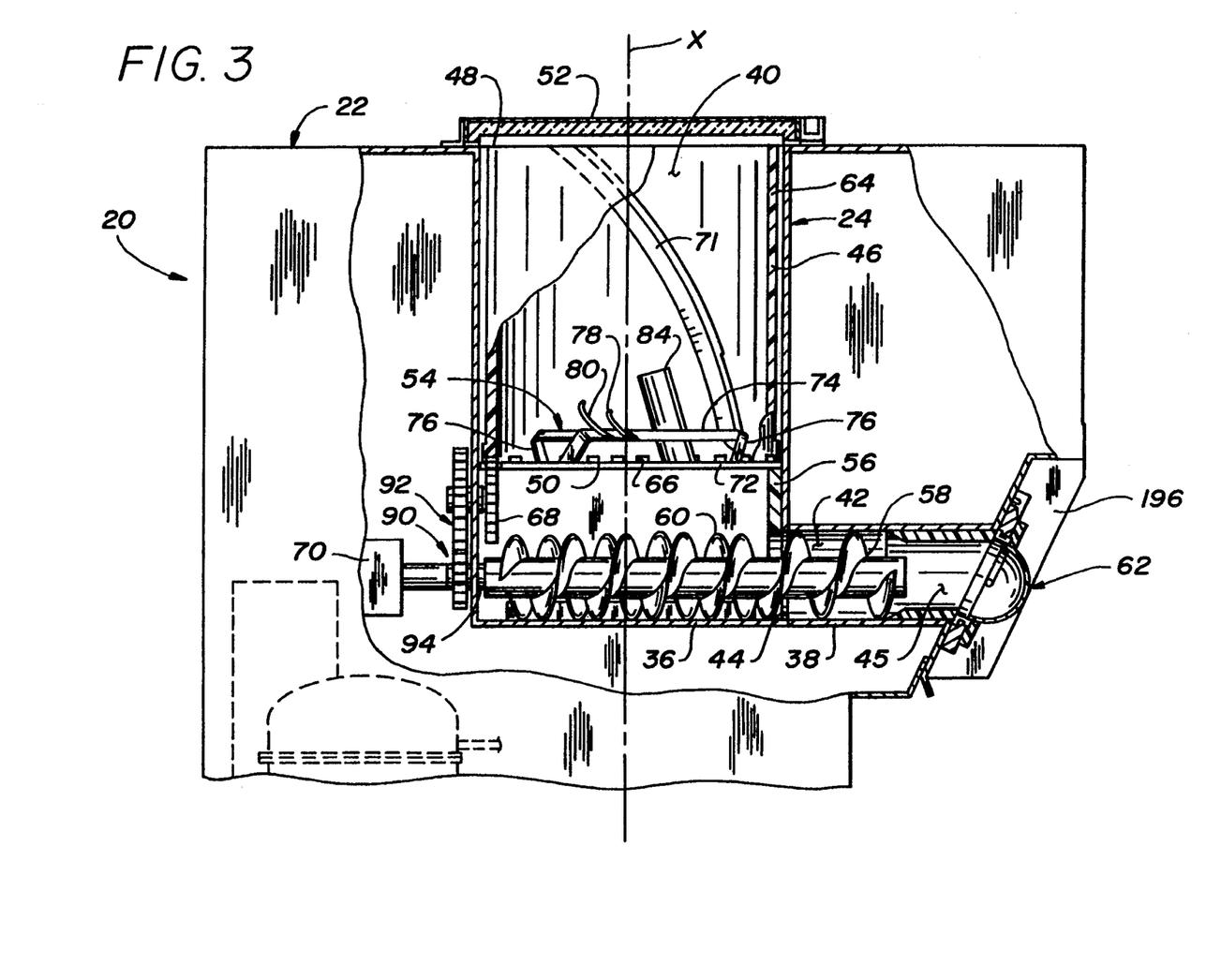
FIG. 3 is a side elevational view of the apparatus of FIG. 1 with parts broken away to show a refrigerated container within a housing and a receptacle within the container for holding a supply of food product.

As shown in FIG. 3, receptacle 46 has a generally cylindric body 64, preferably of ultra high molecular weight (UHMW) synthetic resin material, having a central axis coaxial with axis X, and a ring gear 66 on the lower end of body 64 and preferably integrally formed therewith. Ring gear 66 has teeth adapted to mesh with teeth of a drive gear 68, also preferably of UHMW synthetic resin material, inside chamber 42 rotatable by a motor 70. Rotation of drive gear 68 causes receptacle 46 to rotate about axis X. A rib 71, preferably helical in shape, is affixed to the inside surface of body 64 for preventing relative rotation between receptacle 46 and the supply of food product therein. Rib 71, constituting holding means, is adapted to penetrate the supply of food product as it is loaded into receptacle 46.

Figure 4:
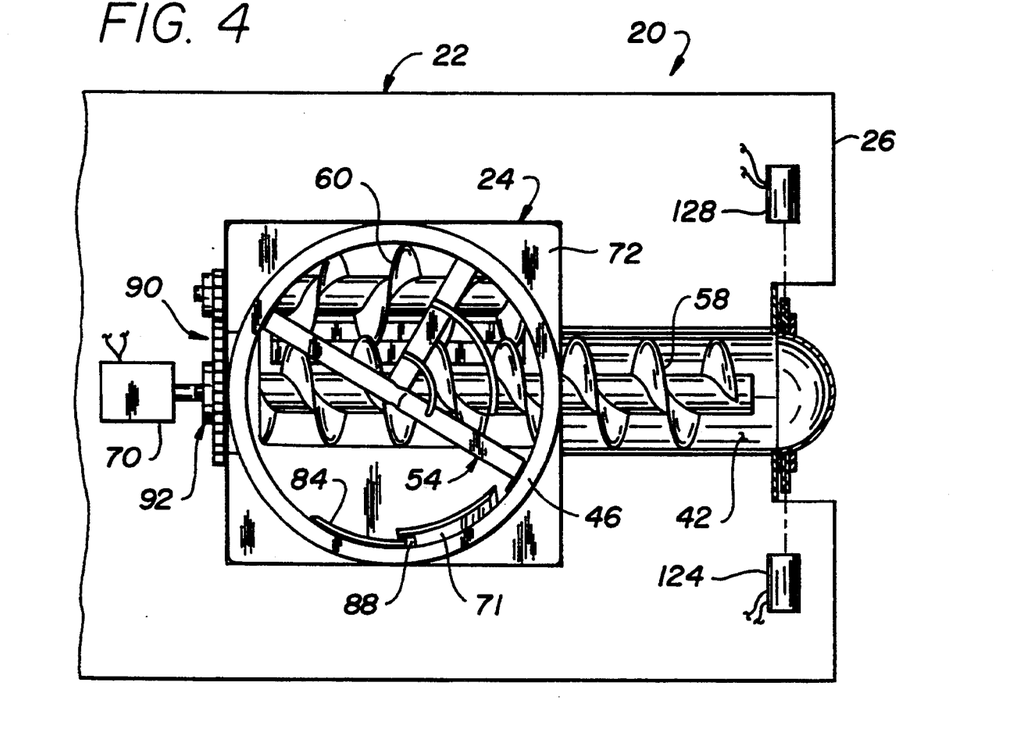
FIG. 4 is a schematic top plan view of the refrigerated container showing a cutting assembly for cutting food product within the receptacle and screw conveyors for conveying the food product from the container.
Figure 5:
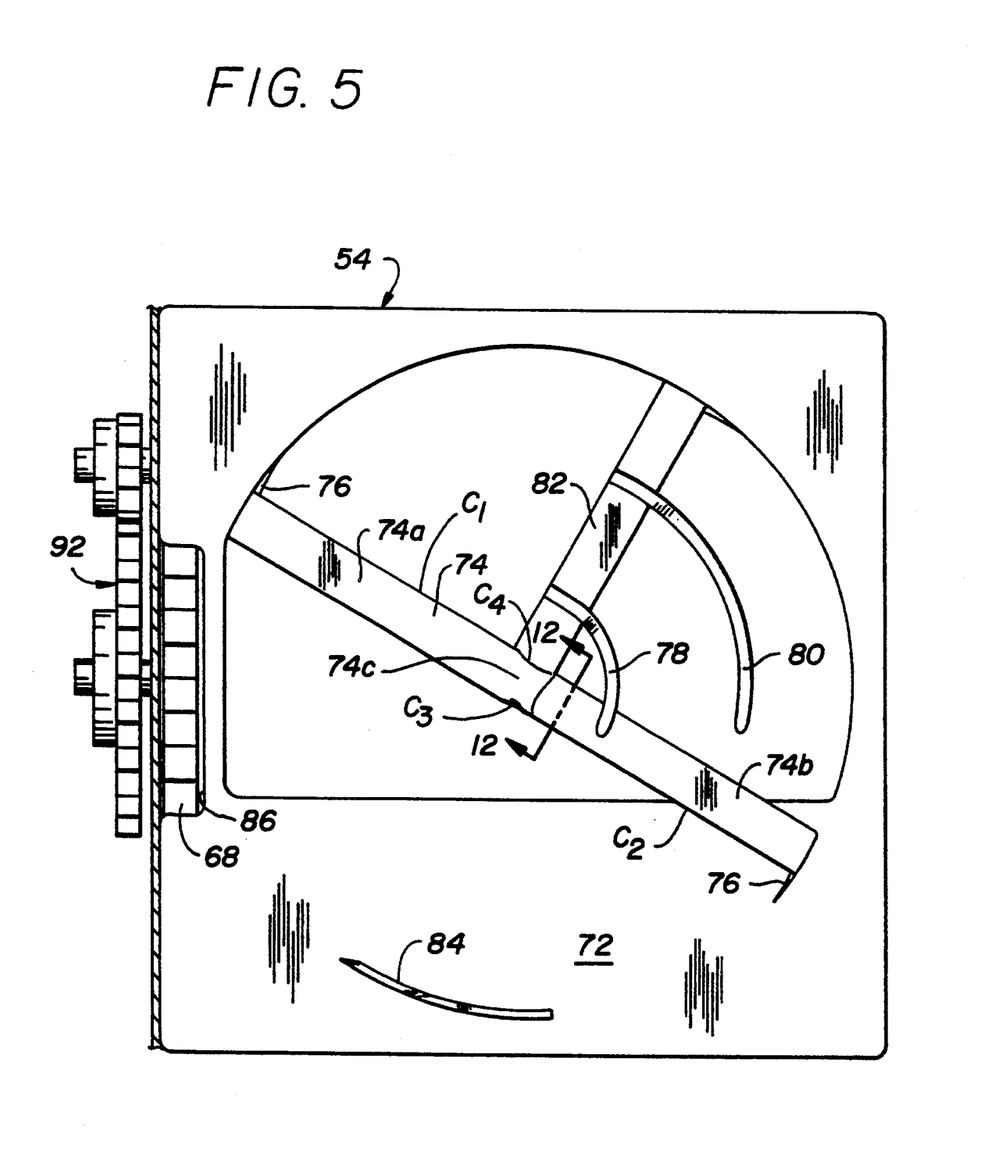
FIG. 5 is an enlarged plan view of the cutting assembly showing a drive train for rotating a drive gear to rotate the receptacle.

As shown in FIGS. 3–5, the cutting assembly has a generally planar base 72, an elongate cutting blade member 74 spaced above and secured to base 72 by a pair of blade supports 76, and two helical tines 78 and 80 extending upwardly from a tine support 82 into receptacle 46. Blade member 74 has opposite end portions 74a and 74b pitched in opposite directions at predetermined angles (e.g., 15 degrees) and a middle transition portion 74c joining end portions 74a and 74b. Preferably blade end portion 74a has a cutting edge $C_1$ along one side of blade member 74, blade end portion 74b has a cutting edge $C_2$ along the opposite side of blade member 74, and middle transition portion 74c has cutting edges $C_3$ and $C_4$ along both sides of blade member 74. Receptacle 46 rests on base 72 and rotates relative thereto when the receptacle is driven by drive gear 68. Tines 78 and 80 are adapted to penetrate the supply of food product in receptacle 46 and to draw the supply down toward blade member 74 upon relative rotation between blade member 74 and receptacle 46. A scraper member 84 extends upward from base 72 and is closely adjacent the inside surface of body 64 of receptacle 46 to scrape the supply of food product from the inside surface of receptacle 46. A generally vertical slot 88 (see FIG. 4) is defined between the lower portion of receptacle 46 and a lower portion of the rib 71 so that scraper member 84 does not contact rib 71 when receptacle 46 rotates relative to the cutting assembly. Base 72 has a slot 86 therein along one of its edges through which an upper portion of drive gear 68 extends to engage ring gear 66.

Referring to FIGS. 3 and 4, cutting assembly 54 and receptacle 46 are each sized for a relatively close vertical sliding fit in chamber 40. Base 72 of cutting assembly 54 is generally square with each side preferably being substantially equal to the outside diameter of receptacle 46. Chamber 40 is generally square in horizontal cross-section with each side of the square preferably being only slightly larger than the sides of the base and the outside diameter of receptacle 46 to limit lateral movement of the cutting assembly and receptacle 46 relative to chamber 40. Since the perimeter of base 72 conforms to the non-circular horizontal cross-section of chamber 40, cutting assembly 54 cannot rotate relative to chamber 40. Platform 56 (see FIG. 9) is generally S-shaped in horizontal cross section and is also dimensioned for a close vertical sliding fit in chamber 40. Since each is sized for a close vertical sliding fit in chamber 40, receptacle 46, cutting assembly 54 and platform 56 may be readily inserted into and removed from chamber 40 without the need to engage any fasteners or guides during or after insertion or to disengage them prior to removal.

Figure 9:
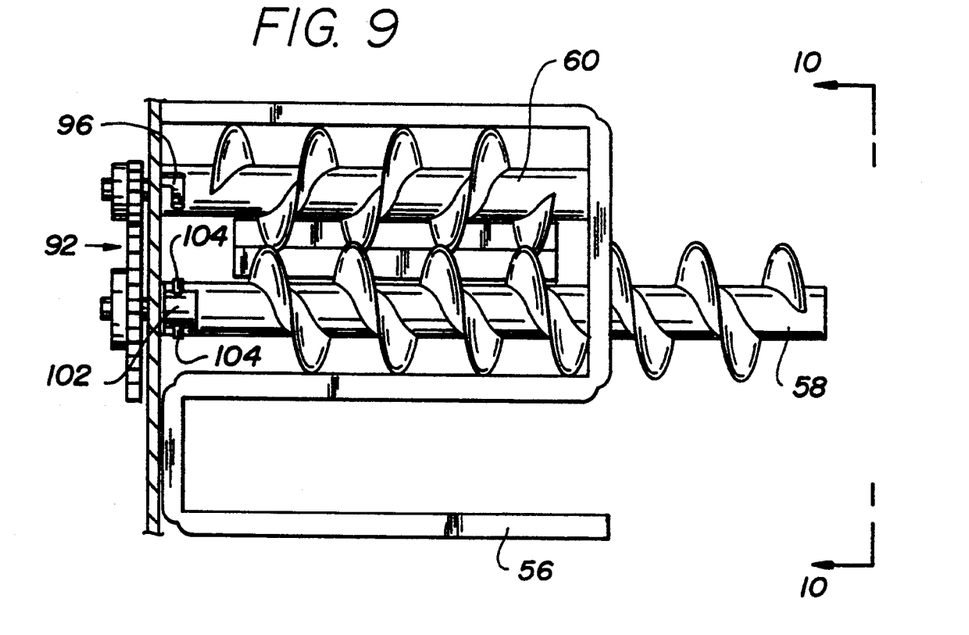
FIG. 9 is a top plan view showing the screw conveyors connected to drive shafts extending from the drive train, the drive gear of FIG. 5 being removed.
Figures 10, 11:
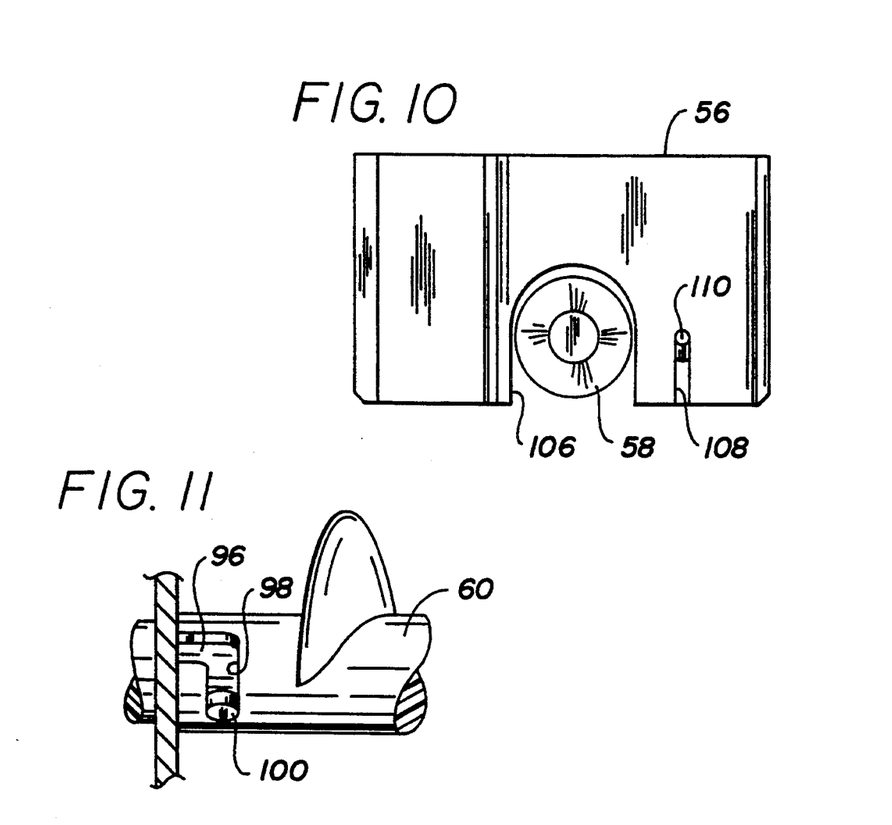
FIG. 10 is a front elevational view taken along the plane of line 10—10 of FIG. 9.
FIG. 11 is an enlarged plan view showing connection of one of the screw conveyors to a drive shaft.
Figure 12:
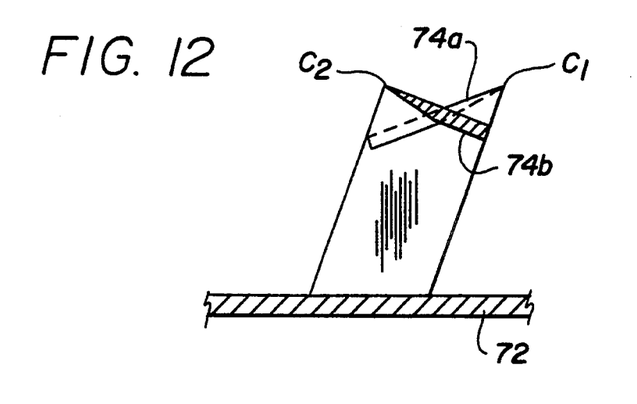
FIG. 12 is an enlarged sectional view taken along the plane of line 12—12 of FIG. 5.

Screw conveyors 58 and 60 extend in a plane generally transverse to the central vertical axis X and constitute means for receiving food product cut from the supply and for conveying the food product from chamber 40. As illustrated in FIGS. 4 and 5, first screw conveyor 58 extends coaxially of receiving chamber 42 substantially to the outlet 45 thereof. Second screw conveyor 60 is shorter than first conveyor 58, extending only the full front-to-back dimension of the lower portion of container 24. Screw conveyors 58 and 60 are preferably made of ultra high molecular weight (UHMW) synthetic resin material or some other suitable material and are driven by a drive mechanism, generally designated 90. This mechanism 90, constituting means for rotating screw conveyors 58 and 60 and means for rotating receptacle 46 relative to cutting assembly 54, includes motor 70, a gear train, generally designated 92, and first and second drive shafts 94 and 96, respectively, keyed to corresponding gears of gear train 92. Motor 70 and gear train 92 are outside of chamber 40 and drive shafts 94 and 96 extend from gear train 92 into chamber 40. Second screw conveyor 60 has a bayonet slot 98 at one of its ends (its left end as viewed in FIG. 9) for receiving a drive pin 100 projecting radially outwardly from second drive shaft 96. Although not shown, first screw conveyor 58 also has a bayonet slot at its end for receiving a drive pin projecting radially outwardly from first drive shaft 94. The drive pins are adapted to be inserted into respective bayonet slots and then rotated to locking positions in which drive shafts 94 and 96 drivingly connect to screw conveyors 58 and 60, respectively. The drive pins and bayonet slots constitute quick-connect means for releasably connecting screw conveyors 58 and 60 to their respective drive shafts 94 and 96. Gear train 92 is adapted to cause drive shafts 94 and 96 to counter-rotate when motor 70 is operated so that screw conveyors 58 and 60 rotate in opposite directions. Also, as illustrated in FIGS. 4 and 9, the flights or blades of screw conveyors 58 and 60 are slanted in opposite directions to convey food product in the same direction (i.e., forward) as screw conveyors 58 and 60 are counter-rotated. Drive mechanism 90 further includes a third drive shaft 102 (see FIGS. 3 and 9) extending into chamber 40 for rotating drive gear 68 to turn receptacle 46. Third drive shaft 102 includes a pair of radially extending drive pins 104 adapted for insertion into slots (not shown) in drive gear 68 to releasably secure drive gear 68 to third drive shaft 102. The gears of gear train 92 are preferably selected to rotate the screw conveyors at the same speed and to rotate receptacle 46 at a much slower speed than that of screw conveyors 58 and 60. As shown in FIGS. 9 and 10, platform 56, also preferably made of UHMW synthetic resin material, has a first slot 106 through which first screw conveyor 58 extends and a second slot 108 for receiving a pin 110 extending axially forward from an end of second screw conveyor 60. Slot 108 and pin 110 prevent lateral movement of second conveyor 60.

Figure 6:
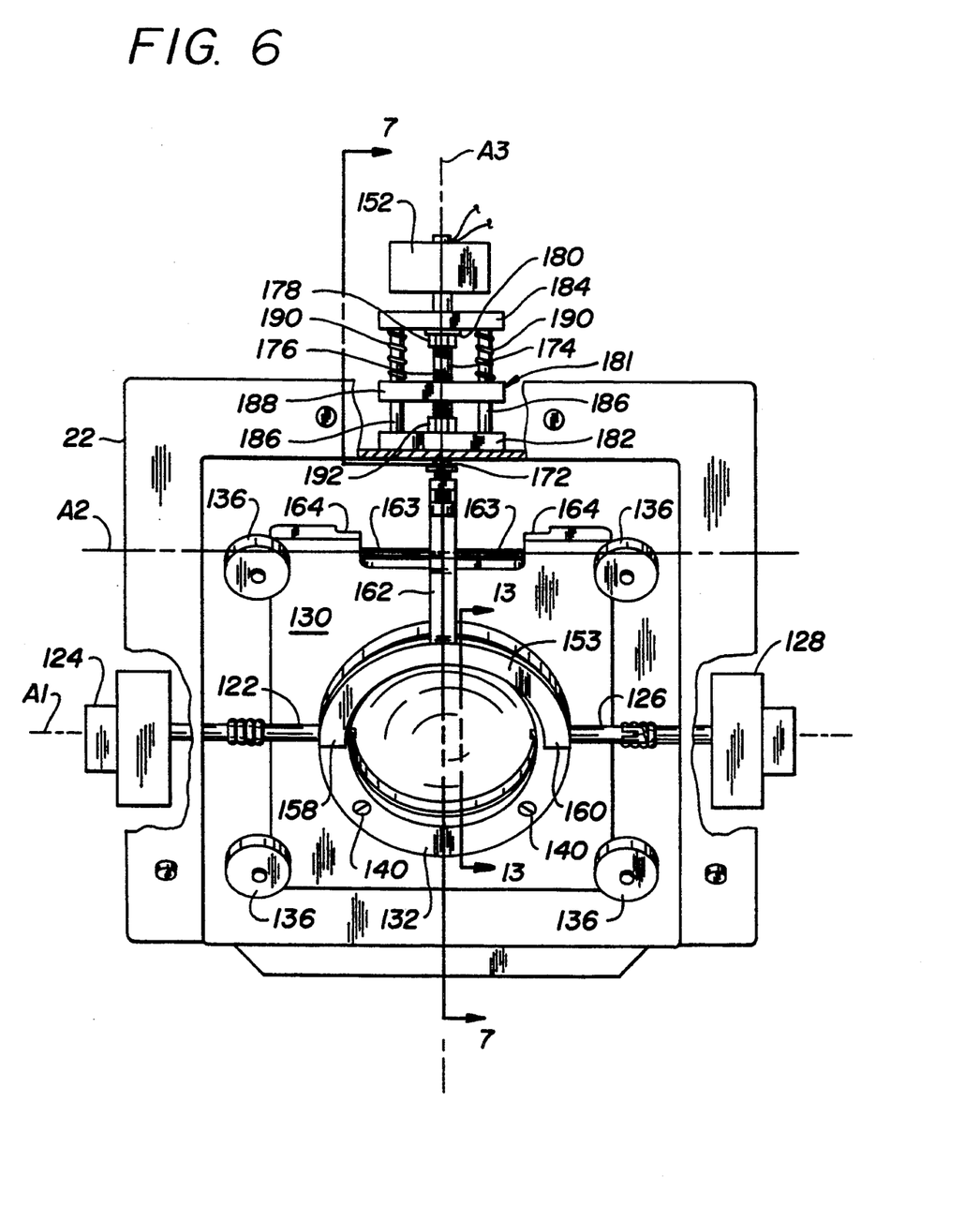
FIG. 6 is a front elevational view of a scoop mechanism of the apparatus, parts being broken away to show details.
Figure 7:
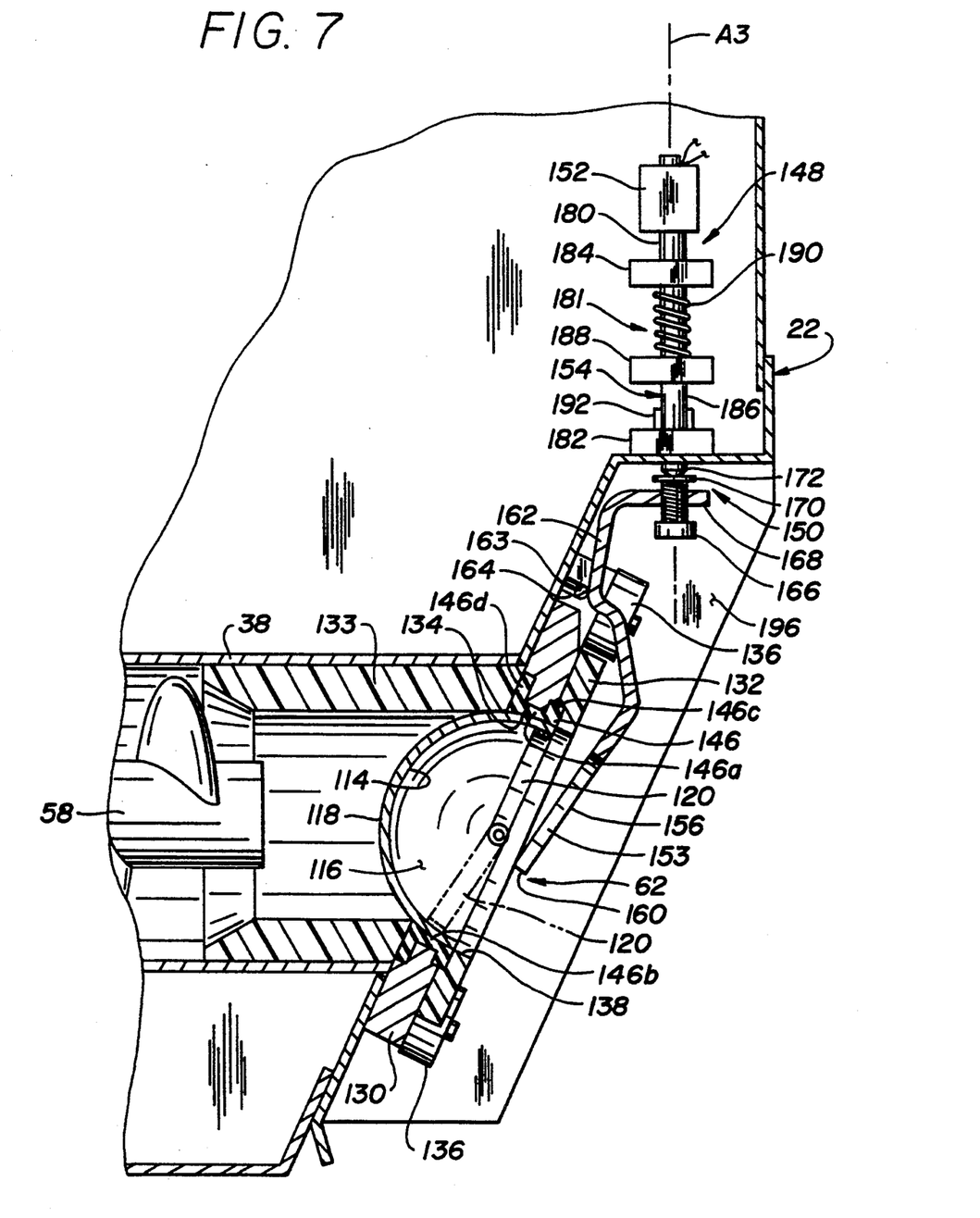
FIG. 7 is a sectional view, taken along the plane of line 7—7 of FIG. 6 showing the scoop member in a dispensing position.
Figure 8:
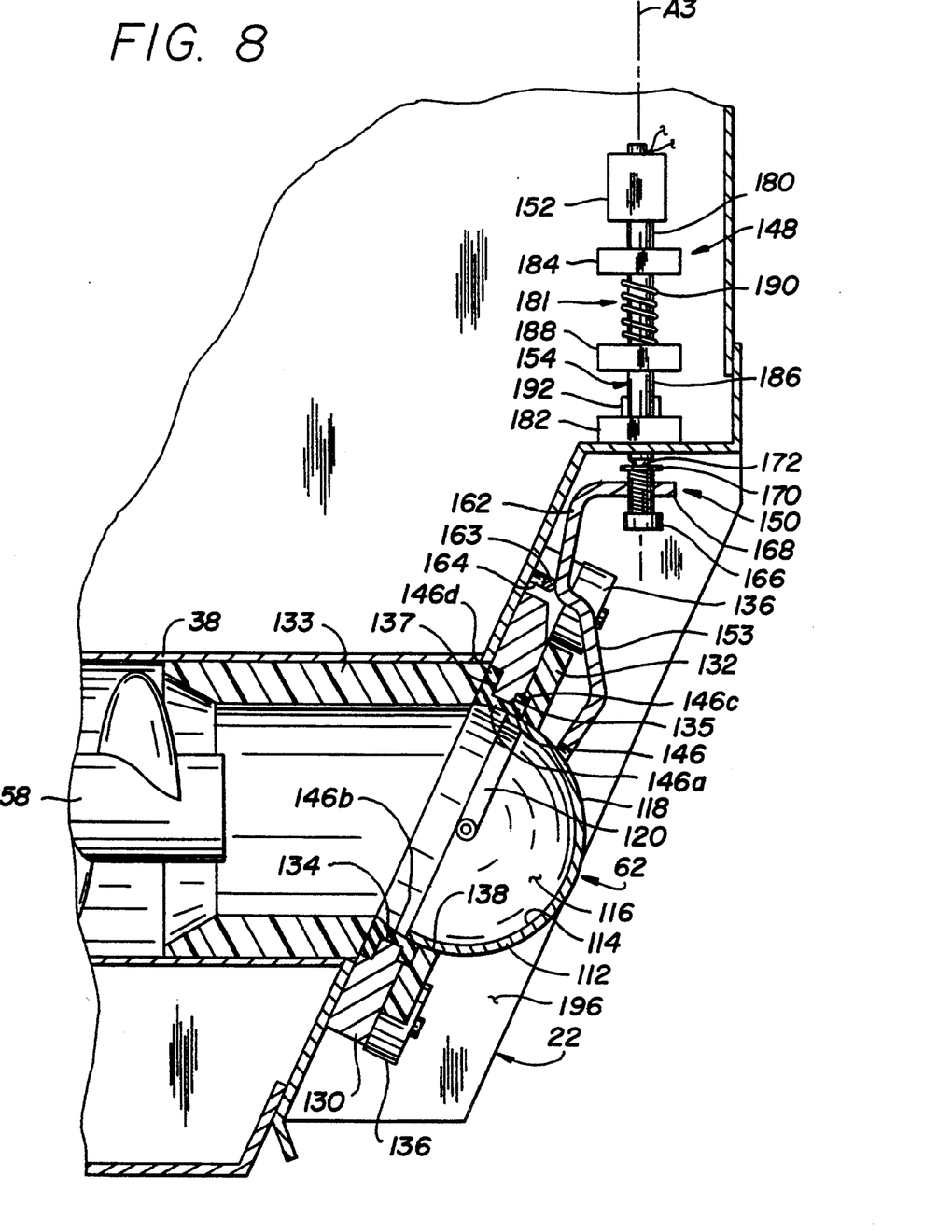
FIG. 8 is a sectional view similar to FIG. 7 showing the scoop member in a receiving position.
Figure 13:
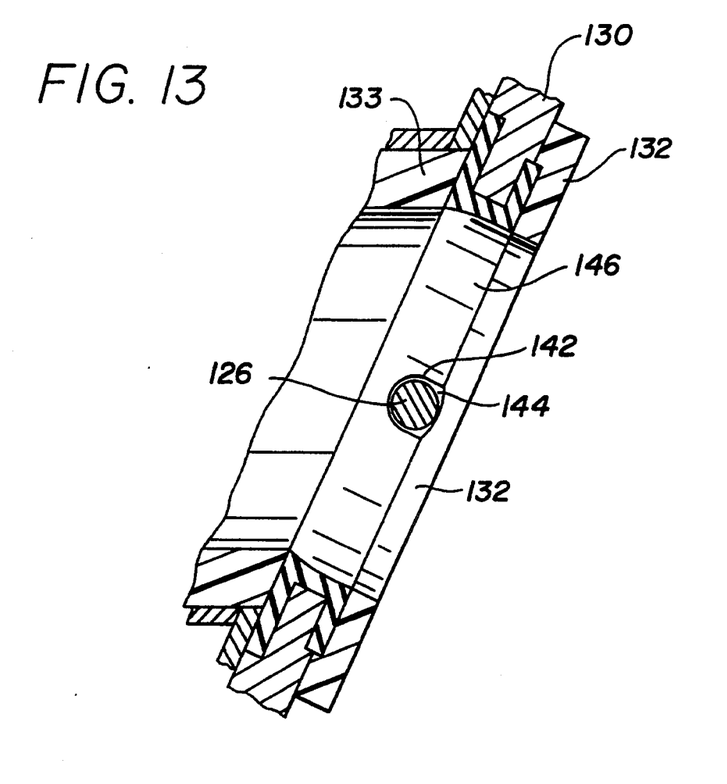
FIG. 13 is an enlarged sectional view taken along the plane of line 13—13 of FIG. 6.

Referring to FIGS. 6–8, the scoop mechanism 62 comprises a scoop member 112 (constituting scoop means) having a concave front or inner surface 114 defining a dispensing chamber 116, and a rounded back 118. Scoop member 112 is pivotable on a generally horizontal axis A1 extending in side-to-side direction with respect to housing 22 from a receiving position (FIG. 8) wherein dispensing chamber 116 of scoop member 112 opens toward the outlet 45 of receiving chamber 42 for receiving food product from the receiving chamber, to a dispensing position (FIG. 7) wherein dispensing chamber 116 opens forwardly and downwardly at an appropriate dispensing angle (e.g., 30 degrees off vertical) away from outlet 45 for dispensing a serving portion of food product held by scoop member 112, and then back to its stated receiving position (FIG. 8). To facilitate the dispensing of food product from scoop member 112, the machine includes a relatively narrow wiper blade 120 curved to conform to the inner surface 114 of scoop member 112. Wiper blade 120 is pivoted on axis A1 from a first position (shown in solid in FIG. 7) to a second position (shown in phantom in FIG. 7). A first shaft 122 is connected to scoop member 112 and driven by a motor 124 and suitable transmission located within housing 22 adjacent front wall 26. A second shaft 126 is connected to wiper blade 120 and driven by a motor 128 and suitable transmission located within housing 22 adjacent front wall 26. A support plate 130, preferably of stainless steel, and a resilient support ring 132, preferably made of a UHMW synthetic resin material, maintain scoop member 112 and wiper blade 120 adjacent the outlet 45 of receiving chamber 42. Support plate 130 abuts a tubular nozzle 133 extending into tubular member 38. Support plate 130 has an opening 134 and first and second annular recesses 135 and 137 and is attached by fasteners 136 to front wall 26. A resilient annular seal 146, attached to support plate 130, comprises an annular body 146a received in opening 134 of support plate 130 and having an opening 146b conforming to the back 118 of scoop member 112, a first flange 146c received in first recess 135, and a second flange 146d received in second recess 137. Support ring 132 has an opening 138 generally flush with opening 146b of seal 146. Fasteners 140 (see FIG. 6) extend through aligned apertures in and fasten support ring 132, seal 146, support plate 130, and nozzle 133. As shown in FIG. 13, seal 146 has a recess 142 opposing a recess 144 in the support ring 132. Recesses 142 and 144 define an aperture for rotatably receiving second shaft 126. Although not shown, seal 146 and support ring 132 have another pair of opposing recesses for rotatably receiving first shaft 122. Contact between shafts 122 and 126 and the recesses in seal 146 limits rearward movement of scoop member 112 relative to housing 22, and contact between shafts 122 and 126 and the recesses in support ring 132 limits forward movement of scoop member 112 relative to housing 22. Seal 146 is in sliding contact with scoop member 112 as scoop member 112 is moved from its receiving position to its dispensing position to prevent leakage of food product.

Apparatus 20 further includes a pressure sensing mechanism, generally designated 148, constituting means for sensing the extent to which food product becomes packed in scoop member 112 as it is conveyed to scoop member 112 and for effecting stoppage of the delivery of food product to scoop member 112 when scoop member 112 becomes packed to a predetermined extent. Pressure sensing mechanism 148 comprises a switch 152 which, upon actuation, is adapted to generate a signal to deenergize motor 70 and thus stop rotation of screw conveyors 58 and 60 and receptacle 46, and an actuator mechanism, generally designated 150, constituting means for actuating switch 152 when scoop member 112 becomes packed to a predetermined extent.

Actuator mechanism 150 comprises a lever 153 pivotable on housing 22 and an actuating assembly, generally designated 154, coupling lever 153 to switch 152. Lever 153 has a generally yoke-shaped lower portion 156 having first and second contact regions 158 and 160 adapted to abut the outer surface of support ring 132, preferably in close proximity to shafts 122 and 126, and a lever arm 162 extending generally upwardly from lower portion 156. Lever arm 162 is mounted to housing 22 by a pair of pivot pins 163 (see FIG. 6) extending generally laterally from lever arm 162. Pivot pins 163 are received in recesses 164 in support plate 130 for facilitating pivoting of lever 153 about a pivot axis A2.

Actuating assembly 154 comprises a first adjustment screw 166 threaded in an opening in the upper end 168 of lever arm 162, a second adjustment screw 174 extending into housing 22, and an adjustment mechanism 181. A flange 170 is fixed to one end of adjustment screw 166 to abut a head 172 of second adjustment screw 174. Second adjustment screw 174, constituting a switch actuator, has a shank 176 extending upwardly from head 172 into housing 22. Shank 176 is movable along a generally vertical axis A3 between an actuating position in which an upper end 178 of screw 174 engages a push button 180 of switch 152 to actuate switch 152 and a non-actuating position.

The force required to axially move shank 176 to its actuating position may be varied by adjustment mechanism 181 which comprises a lower block 182 fixed to housing 22, an upper block 184 secured to and fixed above lower block 182 by a pair of upwardly extending parallel rods 186, and a vertically adjustable middle block 188 slidably connected to rods 186. Shank 176 extends through an aperture in lower block 182 and has a threaded surface which engages a threaded aperture through middle block 188. Compression springs 190, coaxial with rods 186, are positioned between upper block 184 and middle block 188 to urge middle block 188 and shank 176, threaded thereto, downward. A lock nut 192 fixed to shank 176 is adapted to abut the upper surface of lower block 182 to limit downward axial movement of shank 176. Rotating adjustment screw 174 about axis A3 in one direction causes middle block 188 to move vertically upwardly toward upper block 184 thereby to increase the compression of springs 190, and rotating screw 174 in the opposite direction causes middle block 188 to move vertically downwardly away from upper block 184 thereby to decrease the compression of springs 190. The greater the compression of springs 190, the greater the force required to vertically displace adjustment screw 174.

Rotation of screw conveyors 58 and 60 causes food product to move toward and pack against scoop member 112. As food product is packed in scoop member 112, it pushes against scoop member 112 which in turn pushes against resilient support ring 132, thus resulting in forward movement of scoop member 112 and support ring 132 relative to housing 22. Forward movement of scoop member 112 and support ring 132 causes forward movement of the lower portion 156 of lever 153 which results in upward movement (as viewed in FIGS. 6-8) of the upper end 168 of lever arm 162 and first adjustment screw 166 relative to housing 22. First adjustment screw 166 moves upwardly and pushes against the head 172 of second adjustment screw 174. When adjustment screw 166 pushes against screw 174 with a force sufficient to overcome the compression force of springs 190 and move shank 176 to its actuating position, the upper end 178 of screw 174 engages actuator 180 of switch 152 which deactivates motor 70. Rotation of first adjustment screw 166 relative to lever arm 168 varies the amount by which scoop member 112 must be displaced before first screw 166 contacts second screw 174, and rotation of second screw 174 about axis A3 varies the force required to move shank 176 to its actuating position. Thus, pressure sensing mechanism 148 senses movement against spring pressure of scoop member 112 and effects stoppage of delivery of food product to scoop member 112 when scoop member 112 is moved sufficiently to effect actuation of switch 152.

Figure 1:
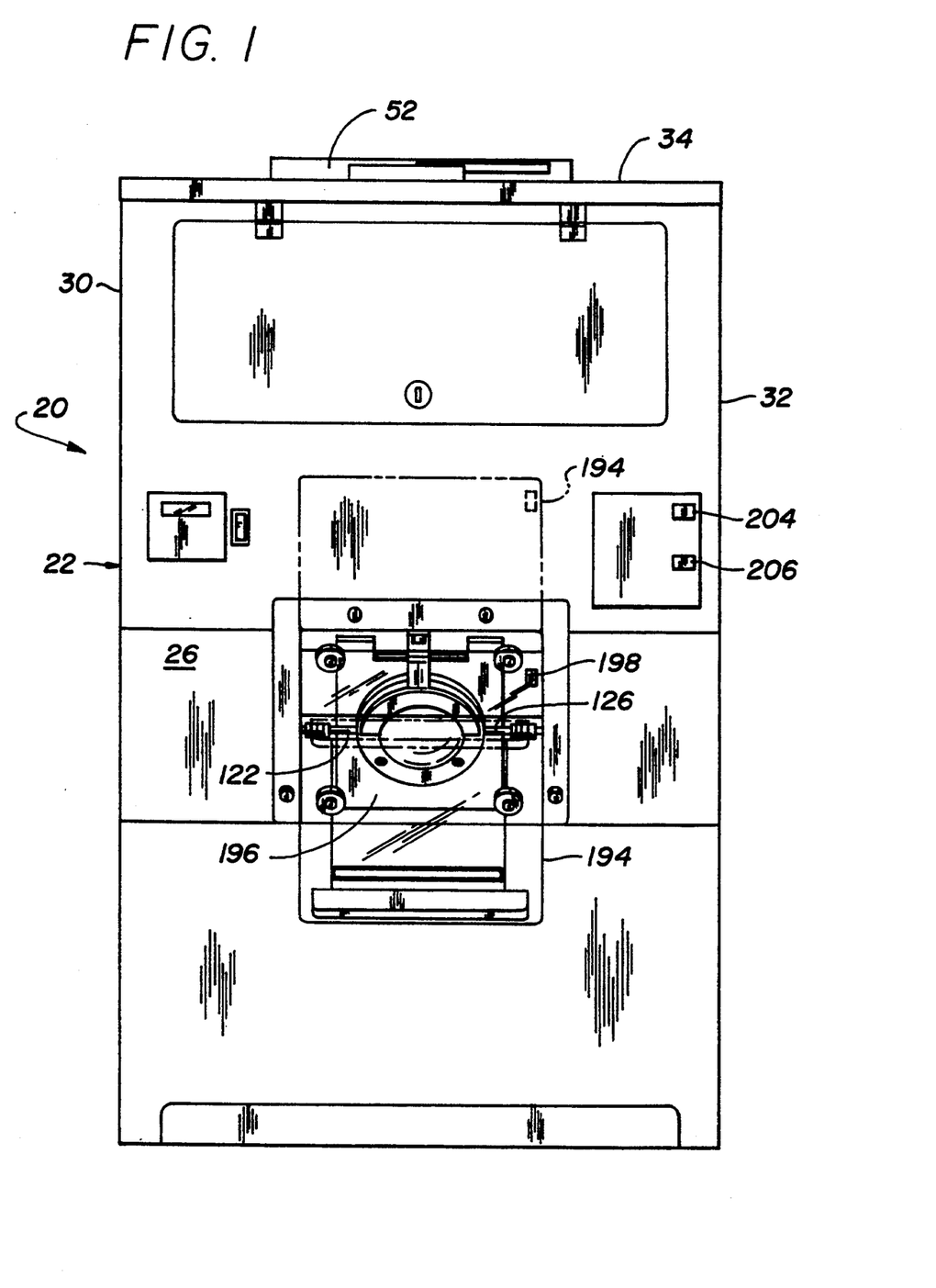
FIG. 1 is a front elevational view of apparatus of the present invention for automatically dispensing food product such as hard ice cream.
Figure 2:
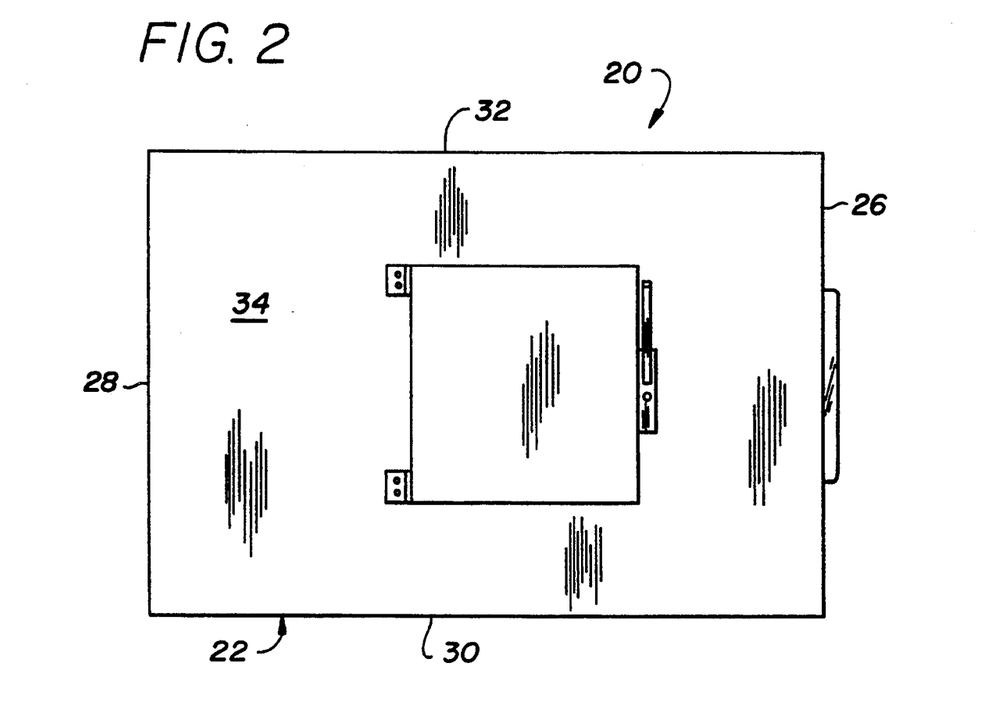
FIG. 2 is a top plan view of the apparatus of FIG. 1.

As shown in FIG. 1, a transparent shield 194, slidably secured to housing 22, is adapted to cover scoop mechanism 62. Shield 194 defines a refrigerated compartment 196 (see FIGS. 7 and 8) around scoop member 112. Preferably, shield 194 has a magnet 198 secured thereto which, upon slidably raising shield 194, activates a magnetic switch (not shown) within housing 22 which activates motor 128 to cause wiper blade 120 to reciprocate. Thus, raising shield 194 activates wiper blade 120. Slidably lowering of shield 194 deactivates motor 128.

Container 24 and compartment 196 may be cooled by a suitable refrigeration system, such as that described in U.S. Pat. No. 5,149,551, incorporated herein by reference. Preferably, the refrigeration system has at least one set of evaporator coils (not shown) for cooling container 24 and compartment 196.

To operate apparatus 20, lid 52 is opened and a supply of food product such as frozen "hard" ice cream is placed in receptacle 46 of refrigerated container 24 in a position where helical tines 78 and 80 penetrate the ice cream. Motor 70 is then energized by suitable means (e.g., a push button 204 at the front of housing 22) to rotate receptacle 46, the ice cream contained therein, and screw conveyors 58 and 60. As the ice cream rotates, stationary helical tines 78 and 80 draw it downward against stationary cutting blade member 74 which cuts the ice cream. The cut pieces of ice cream drop downward into the counter-rotating screw conveyors 58 and 60 which impart a movement to the cut ice cream causing it to move to the inlet 44 of receiving chamber 42. From there, first conveyor 58 conveys the ice cream through the receiving chamber and into dispensing chamber 116 defined by scoop member 112 in its receiving position to fill scoop member 112 with a serving portion. Screw conveyors 58 and 60 and receptacle 46 continue to rotate until dispensing chamber 116 is suitably packed (i.e., packed to a predetermined density) as sensed by pressure sensing mechanism 148, whereupon switch 152 is adapted to generate a signal to deenergize motor 70 and thus stop rotation of screw conveyors 58 and 60 and receptacle 46 to halt further delivery of the ice cream to the receiving and dispensing chambers.

When switch 152 signals motor 70 to stop, scoop motor 124 is automatically energized to cause scoop member 112 to rotate from its receiving position to its dispensing position and an indicator light (e.g., a light 206 at the front of housing 22) indicates that scoop mechanism 62 is ready to dispense a serving of ice cream. Shield 194 is then manually raised and magnet 198 switches the magnetic switch to energize wiper motor 128 to cause wiper blade 120 to wipe scoop member 112, thereby causing the serving of ice cream to be discharged. Preferably, a delay timer within the circuitry causes a predetermined delay (e.g., two seconds) from the raising of shield 194 to the energizing of motor 128 to give the operator time to place a cone, dish, or other suitable receptacle adjacent the serving of ice cream. As long as shield 194 remains raised, motor 128 causes wiper blade 120 to move back and forth to wipe scoop member 112. When shield 194 is lowered, wiper blade 120 returns to its home position and scoop member 112 returns to its receiving position.

The above cycle is repeated as needed, it being understood that after an initial cycle is completed in which the receiving chamber is filled with ice cream, subsequent cycles will be relatively short, since screw conveyors 58 and 60 will only need to rotate a short time before the dispensing chamber is suitably filled and the switch signals stoppage of the screw conveyors.

It is contemplated that relative rotation between cutting assembly 54 and ice cream may be effected in ways other than that illustrated in apparatus 20. For example, the receptacle and ice cream could remain stationary and the cutting assembly could rotate.

Also, while apparatus 20 has been described as having two screw conveyors, it is to be understood that the dispenser could have more than two screw conveyors or only one.

Further, pressure sensing mechanism 148 could be replaced by a pressure sensing mechanism such as that described in U.S. Pat. No. 5,149,551 or any other suitable mechanism.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for automatically dispensing food product such as hard ice cream, comprising an insulated housing having a refrigerated chamber therein, a receptacle in said chamber for holding a supply of food product under refrigeration, said receptacle having an open upper end to permit loading of food product into the receptacle and a lower end, cutting means adjacent the lower end of the receptacle for cutting food product from said supply, conveyer means in said chamber generally below said cutting means for receiving food product cut from said supply and for conveying said food product from said chamber, scoop means for receiving food product conveyed by said conveyer means from said chamber and for dispensing a predetermined quantity of food product, and means for sensing the extent to which food product becomes packed in said scoop means as it is conveyed to the scoop means and for effecting stoppage of the delivery of food product to said scoop means when the scoop means becomes packed to a predetermined extent.

2. Apparatus as set forth in claim 1 further comprising means for effecting relative rotation between said cutting means and said receptacle whereby said cutting means is adapted to cut food product from the supply for delivery to said conveyer means.

3. Apparatus as set forth in claim 2 wherein said means for effecting relative rotation comprises drive means for rotating the receptacle relative to said cutting means.

4. Apparatus as set forth in claim 3 further comprising means for preventing relative rotation between the receptacle and said supply of food product therein.

5. Apparatus as set forth in claim 4 wherein said means for preventing relative rotation between the receptacle and said supply of food product comprises holding means affixed to the receptacle adapted to penetrate said supply of food product as it is loaded into said receptacle.

6. Apparatus as set forth in claim 4 wherein said receptacle is a generally cylindric member of synthetic resin material having a generally vertical central axis, and said drive means comprises a drive motor outside of said refrigerated chamber, a drive gear inside of said chamber rotatable by said drive motor, and a ring gear on the lower end of said receptacle in mesh with said drive gear.

7. Apparatus as set forth in claim 6 wherein said drive gear and said ring gear are fabricated from a high molecular weight synthetic resin material.

8. Apparatus as set forth in claim 1 wherein said refrigerated chamber has a generally vertical central axis, said conveyer means comprising a pair of generally parallel screw conveyers extending in a plane generally transverse to said central vertical axis, and means for rotating the screw conveyers.

9. Apparatus as set forth in claim 8 wherein said means for rotating the screw conveyers comprises a drive motor on the outside of said refrigerated chamber, a pair of drive shafts driven by the drive motor extending into the chamber, and quick-connect means for releasably connecting each screw conveyer to a respective drive shaft.

10. Apparatus as set forth in claim 9 wherein said quick-connect means comprises a drive pin projecting radially outwardly from a respective drive shaft, and bayonet slot means in an end of a respective screw conveyer for receiving said drive pin, said drive pin being adapted to be inserted into said bayonet slot means and then rotated to a locking position in which said drive shaft is drivingly connected to said screw conveyer.

11. Apparatus as set forth in claim 8 wherein said screw conveyers are of a high molecular weight synthetic resin material.

12. Apparatus as set forth in claim 8 wherein said screw conveyers are adapted to be rotated in opposite directions.

13. Apparatus as set forth in claim 1 wherein said refrigerated chamber has a central vertical axis and a non-circular shape in horizontal cross-section, and a support in the chamber for supporting said receptacle at a fixed height relative to said cutting means and said conveyer means, said support having a peripheral shape generally conforming to the non-circular shape of said chamber and being sized for a relatively close vertical sliding fit in said chamber whereby the support may be readily inserted into and removed from the chamber.

14. Apparatus as set forth in claim 1 wherein said scoop means is movable relative to the housing in response to pressure exerted on the scoop means as food product is packed into the scoop means, said means for sensing being responsive to said movement for effecting stoppage of delivery of food product to said scoop means when the scoop means becomes packed to a predetermined extent.

15. Apparatus as set forth in claim 14 wherein said sensing means comprises a pressure switch which, upon actuation, is adapted to effect stoppage of delivery of food product to said scoop means, and actuator means mounted on the housing for actuating said pressure switch, said actuator means being engageable by said scoop means as the scoop means moves in response to said pressure for actuating said pressure switch when said scoop means becomes packed to said predetermined extent.

16. Apparatus as set forth in claim 15 wherein said actuator means comprises a lever pivoted on the housing having a first end engageable by said scoop means and a second end, and an actuating assembly engageable by the second end of the lever, said actuating assembly comprising a switch actuator movable between an actuating position for actuating said pressure switch and a non-actuating position, and spring means biasing said switch actuator toward said non-actuating position, said spring actuator being movable against the bias of said spring means to its actuating position in response to said scoop means exerting a predetermined amount of pressure force against said first end of said lever.

17. Apparatus as set forth in claim 16 wherein the spring pressure exerted by said spring means is adjustable for adjusting said predetermined amount of pressure force.

18. Apparatus as set forth in claim 2 wherein said cutting means comprises a cutting blade, and helix means on the blade adapted to penetrate said supply of food product in said receptacle and to draw said supply down toward the blade upon relative rotation between the blade and said receptacle.

19. Apparatus as set forth in claim 18 wherein said cutting blade comprises an elongate blade member having opposite end portions pitched in opposite directions at predetermined angles, and a middle transition portion joining said two end portions.

20. Apparatus as set forth in claim 19 wherein one blade end portion has a cutting edge along one side of the blade member and the other blade end portion has a cutting edge along the opposite side of the blade member, said middle transition portion having cutting edges along both sides of the blade member.

* * * * *